(No Model.) 5 Sheets—Sheet 1.
I. G. HOOPER.
JAPANNING MACHINE.

No. 385,933. Patented July 10, 1888.

WITNESSES:

INVENTOR:

Irvin G. Hooper

BY Campbell & Co. ATT'YS.

(No Model.)
5 Sheets—Sheet 2.
I. G. HOOPER.
JAPANNING MACHINE.
No. 385,933. Patented July 10, 1888.
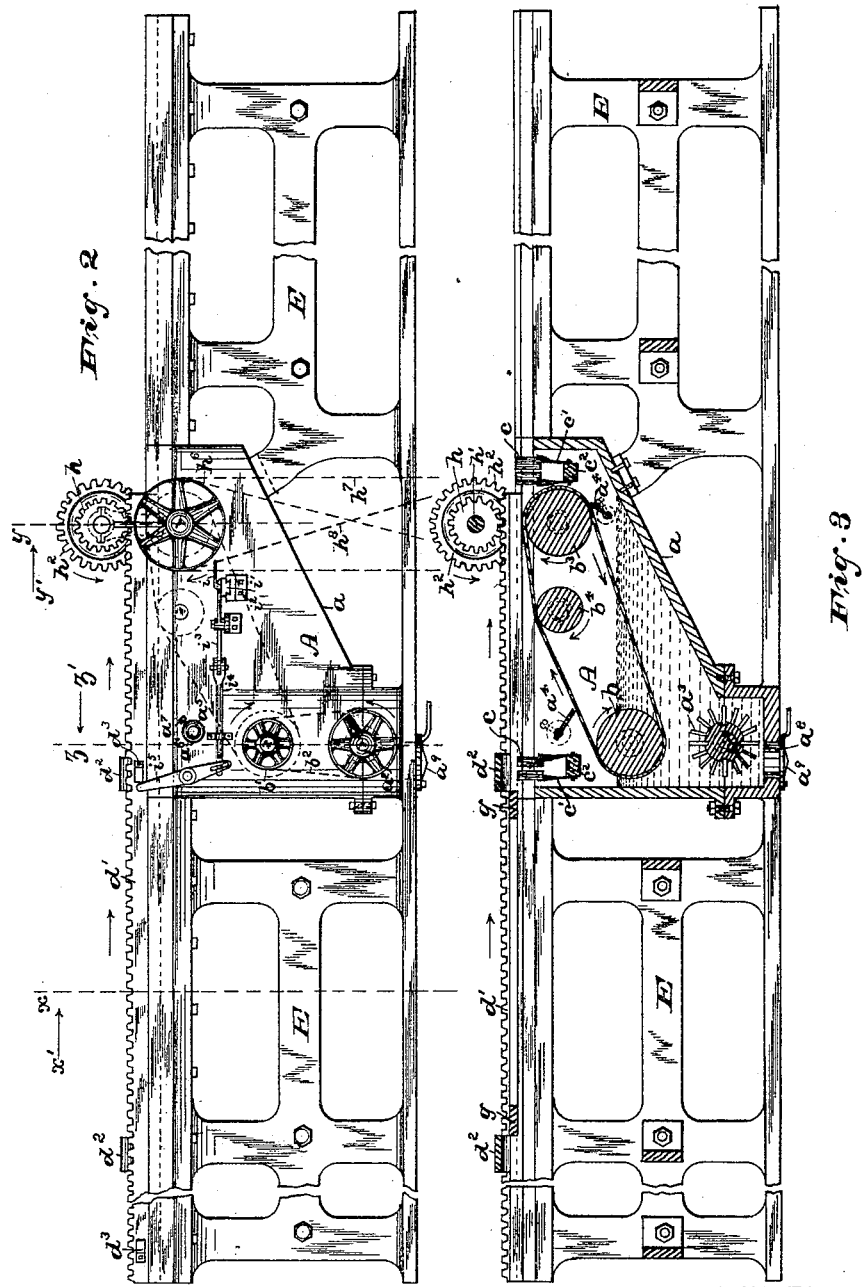
WITNESSES:
INVENTOR:
Irvin G. Hooper,
BY Campbell & Co. ATT'YS.

(No Model.) 5 Sheets—Sheet 3.

I. G. HOOPER.
JAPANNING MACHINE.

No. 385,933. Patented July 10, 1888.

WITNESSES: INVENTOR:
Irvin G. Hooper,
BY Campbell & Co. ATT'YS.

(No Model.) 5 Sheets—Sheet 4.
I. G. HOOPER.
JAPANNING MACHINE.

No. 385,933. Patented July 10, 1888.

WITNESSES:

INVENTOR:
Irvin G. Hooper,
BY Campbell & Co ATT'YS.

(No Model.) 5 Sheets—Sheet 5.

I. G. HOOPER.
JAPANNING MACHINE.

No. 385,933. Patented July 10, 1888.

WITNESSES:

INVENTOR:
Irvin G. Hooper,
BY Campbell & Co. ATT'YS.

UNITED STATES PATENT OFFICE.

IRVIN G. HOOPER, OF NEWARK, NEW JERSEY.

JAPANNING-MACHINE.

SPECIFICATION forming part of Letters Patent No. 385,933, dated July 10, 1888.

Application filed May 17, 1887. Serial No. 238,451. (No model.)

*To all whom it may concern:*

Be it known that I, IRVIN G. HOOPER, a citizen of the United States, residing at Newark, in the county of Essex and State of New Jersey, have invented certain new and useful Improvements in Japanning-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The purpose of this invention is to provide a machine for japanning leather which is of simple construction and which will apply the coats of japan or daub to the hide or split without necessitating any special preparation of the leather, avoiding any waste thereby, and also the extra handling of the leather.

The invention is further designed to more evenly distribute the daub over the surface of the leather, to so treat the same that it is under the perfect control of the operator, and also to so handle the leather that the subsequent operations of handling and finishing the japanned surface may be more readily accomplished.

Figure 1:
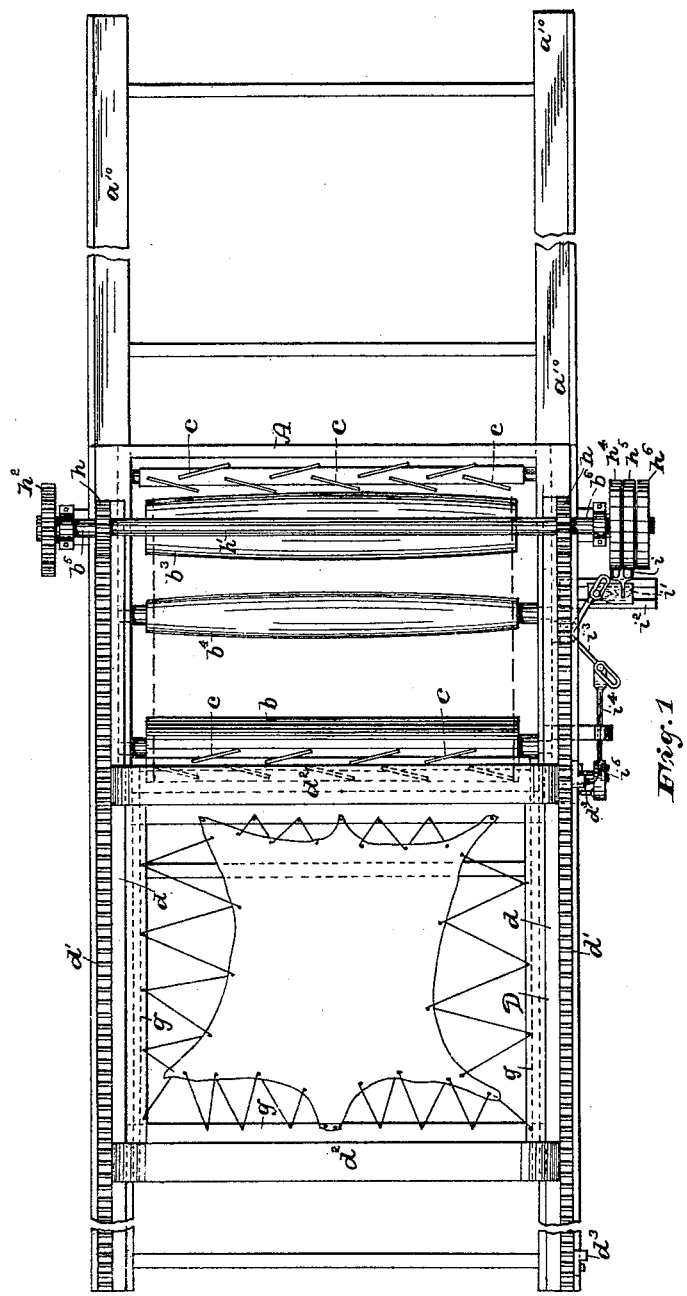
Figure 4:
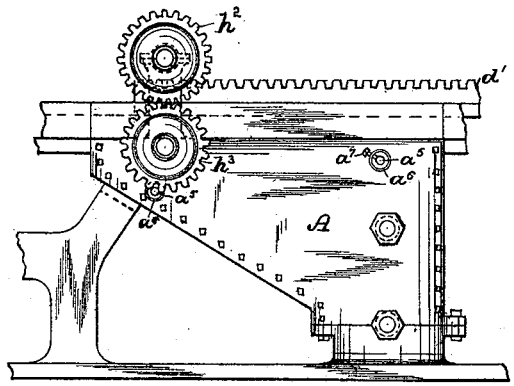
Figure 5:
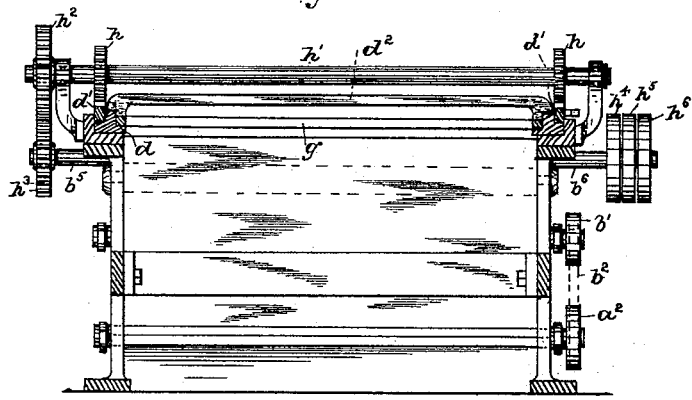
Figure 6:
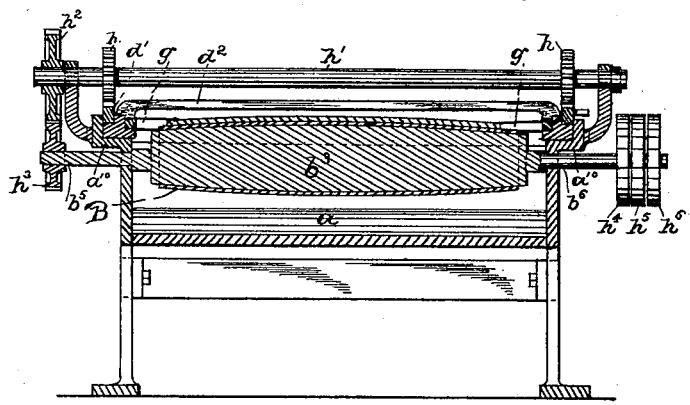
Figure 7:
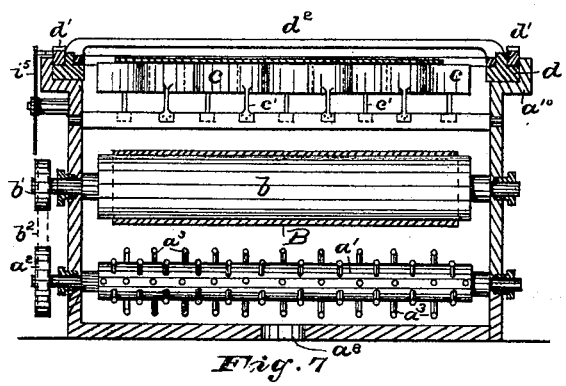
Figure 8:
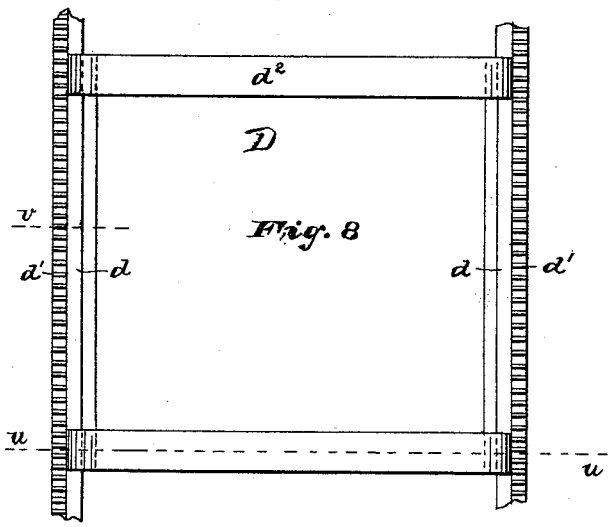
Figure 9:
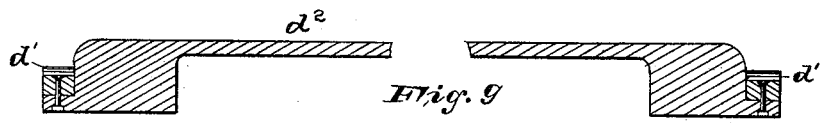
Figure 10:
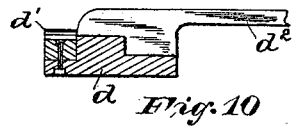
Figure 11:
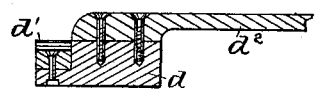
Figure 12:
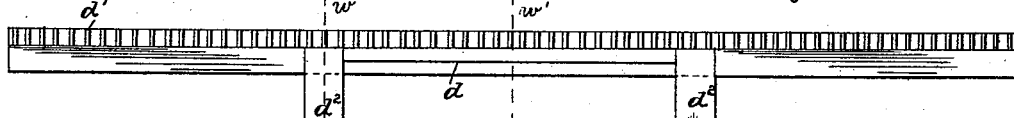
Figures 13, 14:
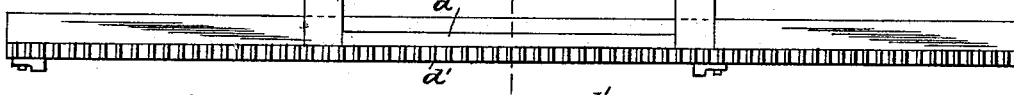
Figure 15:
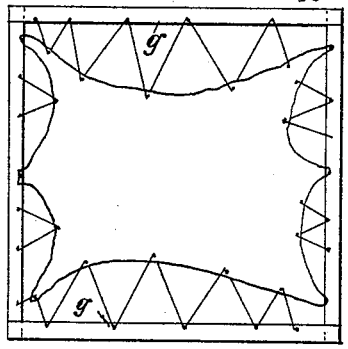
Figure 16:
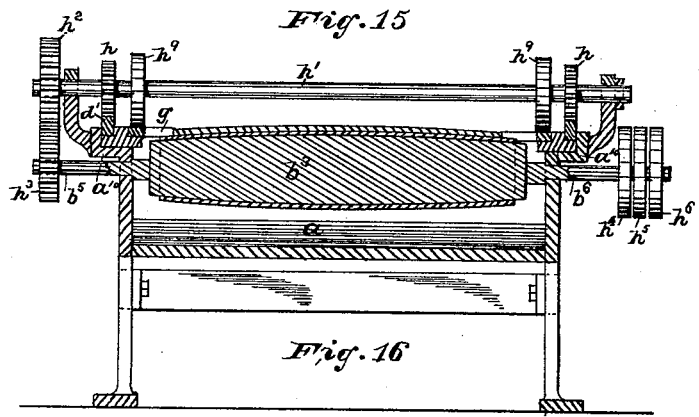

In the accompanying sheets of drawings, in which is illustrated a machine adapted to carry out the principles of my invention, Figure 1 is a plan view of the said machine. Fig. 2 is a side elevation of the same, a portion of the ways at each end of the machine being broken out to permit the enlargement of the view. Fig. 3 is a longitudinal section taken centrally through Fig. 2; and Fig. 4 is a side elevation of the japan-holding tank, looking toward the side opposite to that shown in Fig. 2, the ways at each end thereof being broken off. On Sheet 3, Fig. 5 is a transverse section taken through $x$, Fig. 2, looking in the direction of the arrow $x'$. Fig. 6 is a similar view through line $y$, also looking in the direction of the arrow $y'$, Fig. 2; and Fig. 7 is a sectional view taken transversely through line $z$ in the direction of the arrow $z'$. Fig. 8, on Sheet 4, is a plan of the traveling carriage, the rack thereon being broken away at each end thereof. Fig. 9 is a section taken through $u$, Fig. 8. Fig. 10 is a section of one side of the carriage through $v$ in Fig. 8; and Fig. 11 is a view similar to Fig. 9, showing a modified construction. On Sheet 5, Fig. 12 is a plan of the carriage. Figs. 13 and 14 are sections through $w$ and $w'$ of Fig. 12, respectively. Fig. 15 is a plan of the leather-stretching frame; and Fig. 16 is a section similar to Fig. 6.

In said above-described views, A indicates the japan or daub holding tank, which, as shown in the drawings, is provided with a sloping portion, $a$, which acts to direct the surplus daub back into the bottom of the tank, and, furthermore, reduces the capacity of the tank and confines the daub in that portion of said tank through which the apron or belt B passes in and through the daub, as indicated in Fig. 2. Thus a much less quantity of daub is required than if the tank is rectangular in shape, and consequently less evaporation of the volatile material which is contained in the daub.

In the bottom of the deepest portion of the tank is a stirring or mixing roll, $a'$, journaled in the sides of the tank and provided on one of the journals thereof with a pulley, $a^2$, on the outside of the tank, as shown in Figs. 2 and 7. The constant rotation of said roll $a'$ keeps the daub agitated and maintains its fluidity, so that its consistency is such that it will readily be taken up by the traveling apron or belt B and applied to the leather.

The stirring-roll shown in the drawings consists of a simple roll, $a'$, from the periphery of which project paddles or rods $a^3$; but any suitable and well-known device for the same purpose may be used in lieu thereof. Above the stirring-roll $a'$ is a roll, $b$, which is also journaled in the sides of the tank, and having a pulley, $b'$, on the outside of the tank above the pulley $a^2$, both of which are connected by a belt, $b^2$, dotted on Figs. 2, 5, and 7. At the opposite end of the tank above the sloping portion $a$, and journaled in the sides of the tank near the top thereof, is a second roll, $b^3$, around which and the roll $b$ the traveling belt or daub-conveying apron B passes, said rolls $b$ and $b^3$ being of equal or unequal diameter, according to the speed desired in the apron, and arranged at different levels, so that one end of the apron—for instance, that which passes around the roll $b$—passes through the daub and carries the same up with it over the second roll, $b^3$, as will be understood by reference to Fig. 3. A third roll, $b^4$, is arranged between the rolls $b$ and $b^3$, either on the same level as the roll $b^3$ or slightly below said level, according to the amount of surface of the apron desired to come in contact with the leather to be japanned.

At opposite ends of the tank are placed scrapers $c$, secured to the ends of flexible strips or rods $c'$, which are attached to a bar, $c^2$, extending across the tank from side to side thereof, as indicated in Figs. 1 and 7, said scrapers being arranged overlapping, and are preferably set at an angle with respect to each other, so as to properly distribute the japan or daub evenly over the surface of the leather. A doctor or scraper, $a^4$, is arranged above the apron and also below the same, as in Fig. 3, to regulate the quantity of daub carried up with the apron, said doctor consisting of a flat plate, $a^4$, which may be of rigid or unyielding or of flexible material, and is provided with journals $a^5$, passing through the sides of the tank, on which are formed boxes $a^6$, through which a set-screw, $a^7$, passes, bearing upon the said journals, as indicated in Figs. 2 and 4. By means of the set-screws the doctor may be caused to press upon the apron with any desired degree of pressure. In the bottom of the tank is an opening, $a^8$, through which the daub may be drawn off from the tank when necessary, said opening being closed or covered by a valve or cover, $a^9$, as indicated in Figs. 2 and 3.

The upper side edges of the tank are so made as to form an angular surface, $a^{10}$, as in Fig. 6, which provides a way or guide upon which the leather-carrying carriage D moves, said ways being continued out from both sides of the tank on the frames E, as shown in Figs. 2 and 3, to permit the carriage to slide reciprocally backward and forward over the tank.

The reciprocally-moving carriage D (shown in detail in Figs. 8, 9, and 10) consists of the side frame-pieces, $d$, provided with racks $d'$ thereon, and cross-pieces $d^2$, connecting the said ratchet-strips and placed equally distant from the ends of said strips and at some distance apart, as in Figs. 1 and 8. The side strips, $d$, are recessed at $d^3$ between the cross-pieces, and in said recesses the leather-stretching frame $g$ is laid, as shown in Fig. 1. The cross-pieces $d^2$ may be raised above the plane of the side pieces, as shown in Figs. 7 and 9, and may either be formed integrally with said side pieces, as in said Fig. 9, or bolted to the side pieces, as in Fig. 11. By raising the cross-pieces, as above stated, ample room is provided beneath the same for the carriage to pass over the scrapers without striking them.

The mechanism illustrated in the drawings for imparting reciprocal motion to the leather-carrying carriage consists of gear-wheels $h$, meshing with the racks on said carriage and arranged on the shaft $h'$, which extends across the tank above the roll $b^3$, and is provided on one end with a gear-wheel, $h^2$, which meshes with the gear $h^3$ on the journal $b^5$ of the roll $b^3$. On the opposite journal, $b^6$, of said roll are arranged the driving-pulleys $h^4$, $h^5$, and $h^6$, the pulleys $h^4$ and $h^6$ being keyed on said journal, while the pulley $h^5$ is loosely arranged on the journal. Straight and cross belts $h^7$ and $h^8$, respectively, as dotted on Fig. 2, are employed to operate the pulleys, being driven by a pulley. (Not shown in said figure.)

The device shown in the drawings for shifting the belts is illustrated in Figs. 1 and 2, and consists of a fork, $i$, secured to a slide, $i'$, which moves reciprocally in a guide, $i^2$, bolted to the side of the tank, said fork and slide being operated by a bell-crank or lever, $i^3$, which is in turn moved by the rod $i^4$ and pivoted lever or bar $i^5$. Projections $d^3$ are formed on one side of the carriage and are so placed that as the carriage reaches the end of its movement in one direction one of said stops strikes the lever $i^5$ of the shifting mechanism, which changes the belts, and thereby causes the carriage to reverse its movement, and in this manner the carriage passes reciprocally over the tank as many times as is required, the second stop striking the said lever $i^5$ at the end of the return movement of the carriage, as will be understood by reference to Fig. 2.

In Fig. 16, Sheet 5, are shown rollers or pulleys $h^9$, keyed on and turning with the shaft $h'$, which bear upon the top of the leather-stretching frame $g$, and thus prevent any lifting or warping thereof above the daubing-apron. This provision is of considerable importance, as the leather-stretching frames, owing to their frequent exposure out-of-doors, are liable to become warped and twisted, and when placed in the carriage might prevent the desired contact of the leather with the apron.

When the frame-holding rolls $h^9$ are employed, the cross-pieces $d^2$, instead of being raised, as heretofore described, as shown in Figs. 5, 6, 7, and 9, are countersunk in the side strips, $d$, as in Figs. 12 to 16, inclusive, so as not to interfere with the movement of the carriage as it passes beneath the rolls $h^9$.

To reduce the friction and resistance of the reciprocating carriage as it moves upon the ways $a^{10}$, rollers $k$, Figs. 13 and 14, are provided in the bottom of the side strips, $d$, of the carriage.

As hereinbefore stated, the reciprocating carriage is driven from the roll $b^3$ through the gears $h^3$, $h^2$, and $h$, while the rolls $b$ and $b^4$ and the mixing-roll $b^3$ are driven through and by the apron B, which thus acts as a belt, and also through and by the pulleys $b'$ and $a^2$ and the belt $b^2$.

The relative movements of the reciprocating carriage and the daub-carrying apron are so regulated that they move in the same direction, but at different rates of speed, the apron traveling, preferably, faster than the carriage. The effect of this arrangement is that the apron is caused to brush or rub against the leather, thus producing an effect similar to hand-work and causing the daub to adhere closely to the surface of the leather. After the daubed or japanned surface leaves the apron it passes over and in contact with the scrapers c, which, because of the alternated and inclined arrangement, distribute the daub evenly over the surface of the leather without streaking the same, and because of their readily yielding upon meeting any resistance there is no danger of tearing or injuring the leather should they encounter any lumps of daub or any irregularities in the surface of the leather itself. The hide may be moved reciprocally over the apron and scrapers as many times as may be deemed necessary to give the proper surface to the hide.

As indicated in Figs. 1, 6, &c., the roll $b^3$ is preferably crowned or enlarged at the middle thereof to cause the leather to lie smoothly upon the apron and roll, and thereby insure the contact of the daub with every part of the surface of the hide. While this form of roll is considered preferable, I may use a cylindrical roll in lieu thereof and secure satisfactory results.

The apron may be made of canvas or any suitable material that will take up and carry the daub, or, as a modified form, may be made of a number of united slats, each of which is covered on the outside with felt or other suitable material.

The primary advantage of my invention, and also the principal object, is to avoid any handling of the hide by japanning the same in the stretching or drying frame by inserting the hide and frame together in the mechanism for applying the daub without removing the said hide from the frame. It is this feature of my invention which I wish to claim, broadly, and which I deem of special importance. This method of handling and japanning the hide not only reduces the time and labor involved in applying the daub, but, also, my manner of japanning the under surface of the leather prevents the soiling of the back of the hide by the accidental contact of the daub therewith. Further, by this method every part of the hide is japanned with equal facility, and no waste is caused by cutting off the shanks, butts, &c.

Having thus described my invention, what I claim as new is—

1. The combination, with a leather-stretching frame and the stretched leather thereon, of a daub receptacle or tank, a traveling carriage constructed to hold said frame and to move reciprocally across said tank, a daub-conveying apron arranged in said tank and operating to transfer the daub from the tank to the under side of said stretched leather, and actuating devices for causing the movements of said carriage and apron, for the purposes set forth.

2. The combination, with a leather-stretching frame and the stretched leather thereon, of a daub receptacle or tank, a traveling carriage constructed to hold said frame and to move reciprocally across said tank, a daub-conveying apron arranged in said tank and operating to transfer the daub from the tank to the under side of the stretched leather, flexible or yielding scrapers arranged to distribute the daub over the surface of the leather, devices operating to cause the said apron to lift the daub from the tank to the leather, and means whereby said carriage and frame are moved reciprocally across the tank and scrapers, for the purposes set forth.

3. The combination of a leather-stretching frame, a daub receptacle or tank, a reciprocating carriage constructed to receive said frame and to move reciprocally across said tank, a daub-conveying apron arranged in said tank and operating to transfer the daub in the tank to the under side of the leather when in the stretching-frame, a daub agitator or mixer arranged and moving in said daub-tank, and actuating devices for operating said mixer, for the purposes set forth.

4. In a japanning-machine, the combination of a daub-holding tank of the form herein specified, rolls $b$ $b^3$, arranged in said tank at different levels, a daub-conveying apron arranged around said rolls, ways extending on and in opposite directions from said tank, a frame-holding carriage arranged and moving on said ways and provided with a rack thereon, a pinion meshing with said rack or racks, and means for actuating said pinions, for the purposes set forth.

5. In a japanning-machine, the combination of a tank, A, rolls $b$ $b^3$, journaled in said tank, said roll $b^3$ being provided with pulleys $h^4$, $h^5$, and $h^6$ thereon and a gear, $h^3$, as herein set forth, ways $a^{10}$, extending on and oppositely from said tank, a frame-holding carriage moving on said ways and provided with racks $d'$ on the upper side thereof, a shaft, $h'$, extending above said tank, having pinions $h$ thereon, meshing with said racks $d'$, and a gear meshing with the gear on the roll $b^3$, for the purposes set forth.

In testimony that I claim the invention set forth above I have hereunto set my hand this 7th day of May, 1887.

IRVIN G. HOOPER.

Witnesses:
FREDK. F. CAMPBELL,
FREDK. C. FRAENTZEL.